US012242764B2

(12) United States Patent
Oshima (10) Patent No.: US 12,242,764 B2
(45) Date of Patent: Mar. 4, 2025

(54) INFORMATION PROCESSING SYSTEM, IMAGE FORMING APPARATUS, AND NON-TRANSITORY COMPUTER READABLE MEDIUM STORING PROGRAM

(71) Applicant: FUJIFILM Business Innovation Corp., Tokyo (JP)

(72) Inventor: Akihide Oshima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 597 days.

(21) Appl. No.: 17/391,038

(22) Filed: Aug. 2, 2021

(65) Prior Publication Data
US 2022/0300225 A1   Sep. 22, 2022

(30) Foreign Application Priority Data

Mar. 22, 2021  (JP) ................. 2021-047230

(51) Int. Cl.
*H04N 1/04*  (2006.01)
*G06F 3/12*  (2006.01)
(Continued)

(52) U.S. Cl.
CPC .......... *G06F 3/1236* (2013.01); *G06F 3/1203* (2013.01); *G06F 3/1231* (2013.01);
(Continued)

(58) Field of Classification Search
USPC ....................................... 358/1.15
See application file for complete search history.

(56) References Cited

U.S. PATENT DOCUMENTS

| 2013/0003103 | A1  | 1/2013  | Barber |
| 2015/0324152 | A1  | 11/2015 | Ding |
| 2022/0300225 | A1* | 9/2022  | Oshima ................. G06F 3/1286 |

FOREIGN PATENT DOCUMENTS

| JP | 2015119273 | 6/2015 |
| JP |    6047480 | 12/2016 |
| JP | 2020154802 | 9/2020 |

OTHER PUBLICATIONS

"Search Report of Europe Counterpart Application", issued on Mar. 1, 2022, pp. 1-11.

(Continued)

*Primary Examiner* — Cheukfan Lee
(74) *Attorney, Agent, or Firm* — JCIPRNET (57) ABSTRACT

An information processing system includes a first processor mounted on a first information processing apparatus installed in a shared space and shared by plural users who do not belong to the same organization, a second processor mounted on a connection server installed outside the shared space and connected to a local area network of an organization to which each of plural users belong, and the connection server having a virtual private line connection function, and a third processor mounted on a management server which is installed outside the shared space and the local area network of each organization, and manages connection server connection information necessary for establishing a virtual private line with the connection server of each organization, in which the third processor is configured to, in response to a connection information acquisition request in which identification information on an organization transmitted from the first information processing apparatus is designated, return the connection server connection information corresponding to the organization designated in the connection information acquisition request, and the first processor is configured to connect a virtual private line with (Continued)

the connection server of the organization, by using the connection server connection information corresponding to the organization acquired by transmitting, to the management server, the connection information acquisition request including the identification information on the organization designated from a user of the first information processing apparatus.

10 Claims, 4 Drawing Sheets

(51) Int. Cl.
      *H04L 9/40*       (2022.01)
      *H04L 12/46*      (2006.01)
      *H04N 1/44*       (2006.01)

(52) U.S. Cl.
      CPC ........ *G06F 3/1286* (2013.01); *H04L 12/4641* (2013.01); *H04L 63/0272* (2013.01); *H04N 1/4406* (2013.01)

(56) References Cited

OTHER PUBLICATIONS

"Notice of Reasons for Refusal of Japan Counterpart Application," issued on Dec. 3, 2024, with English translation thereof, p. 1-p. 8.

\* cited by examiner

MANAGEMENT SERVER INFORMATION

| COMPANY AUTHENTICATION INFORMATION | | URL |
|---|---|---|
| COMPANY ID | PASSWORD | |
| a | passa | https: :www.a.kanri.com |
| b | passb | https: :www.b.kanri.com |
| ... | | |

FIG. 3

MANAGEMENT SERVER INFORMATION

| COMPANY AUTHENTICATION INFORMATION | VPN SERVER CONNECTION INFORMATION | AUTHENTICATION SERVER CONNECTION INFORMATION |
|---|---|---|
| ·COMPANY ID<br>·PASSWORD | ·SERVER ADDRESS<br>·PORT NUMBER<br>·AUTHENTICATION INFORMATION<br>(ID, PASSWORD, CERTIFICATE, VPN SETTINGS, ETC.) | ·SERVER ADDRESS<br>·PORT NUMBER<br>·AUTHENTICATION INFORMATION<br>(ID, PASSWORD, CERTIFICATE, ETC.) |

INFORMATION PROCESSING SYSTEM, IMAGE FORMING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-047230 filed Mar. 22, 2021.

BACKGROUND

(i) Technical Field

The present invention relates to an information processing system, an image forming apparatus, and a non-transitory computer readable medium storing a program.

(ii) Related Art

For example, in a case where connecting a computer installed in the head office to a computer installed in another base such as a branch office or a mobile terminal taken outside the company via a network, for example, it is preferable to establish a virtual private line, so-called a Virtual Private Network (VPN), from the viewpoint of security and to exchange information via the VPN. In order to establish a VPN, each computer to be connected to the VPN holds information necessary for establishing the VPN, and refers to the information to make the VPN connection in a case of making the VPN connection.

Incidentally, in recent years, with the reform of working methods and the spread of remote work, the number of workplaces used by cross-enterprise workers, freelancers and students, such as coworking spaces and shared offices, has expanded. The administrator of the workplace installs a multifunction device or the like equipped with a printing function or a fax function in the workplace to provide services to the users in the workplace. Other examples of related art include JP2013-260459A and JP6047480B.

SUMMARY

The information processing apparatus installed in the shared space is shared by a plurality of users who do not belong to the same organization. For example, in order to connect the information processing apparatus to the server installed in the organization to which the user belongs by a virtual private line, it is necessary to make the information processing apparatus use the information necessary for establishing the virtual private line with the server. However, the information necessary for establishing a virtual private line with the server installed in the organization is information regarding the organization and can be said to be confidential information. Nevertheless, holding the information regarding an organization in the information processing apparatus shared by users belonging to another organization can pose a security problem.

Aspects of non-limiting embodiments of the present disclosure relate to an information processing system, an image forming apparatus, and a non-transitory computer readable medium storing a program that connects an information processing apparatus installed in a shared space and shared by a plurality of users who do not belong to the same organization to the organization via a virtual private line, without causing the information processing apparatus to hold information regarding the organization.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a first processor mounted on a first information processing apparatus installed in a shared space and shared by a plurality of users who do not belong to the same organization, a second processor mounted on a connection server installed outside the shared space and connected to a local area network of an organization to which each of the plurality of users belong, and the connection server having a virtual private line connection function, and a third processor mounted on a management server which is installed outside the shared space and the local area network of each organization, and manages connection server connection information necessary for establishing a virtual private line with the connection server of each organization, in which the third processor is configured to, in response to a connection information acquisition request in which identification information on an organization transmitted from the first information processing apparatus is designated, return the connection server connection information corresponding to the organization designated in the connection information acquisition request, and the first processor is configured to connect a virtual private line with the connection server of the organization, by using the connection server connection information corresponding to the organization acquired by transmitting, to the management server, the connection information acquisition request including the identification information on the organization designated from a user of the first information processing apparatus.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described with reference to the drawings.

Figure 1:
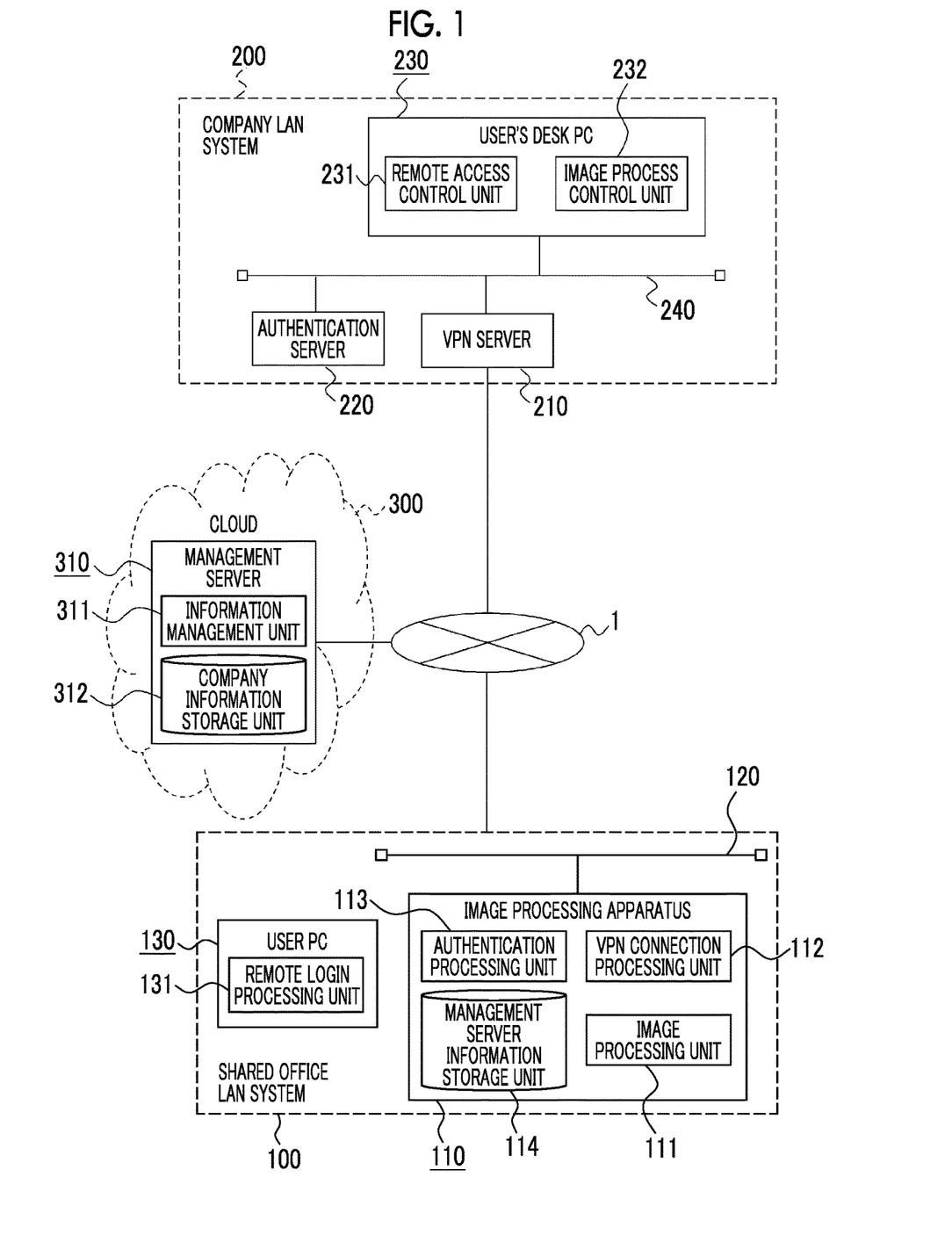
FIG. 1 is a block diagram illustrating an information processing system according to an exemplary embodiment of the present invention.

FIG. 1 is a block diagram illustrating an embodiment of an information processing system according to the present exemplary embodiment. FIG. 1 illustrates a configuration in which a shared office Local Area Network (LAN) system 100, a company LAN system 200, and a management server 310 installed in a cloud 300 are connected by a network 1 composed of the Internet or the like. The information processing system in the present exemplary embodiment can be achieved by combining existing computers and the like as hardware, and as will be described later, the control of characteristic information processing in the present exemplary embodiment is achieved by the software running on each computer.

The information processing system may include shared office LAN systems 100 of plural shared offices and company LAN systems 200 of plural companies, but each shared office LAN system and company LAN system may have respective configurations to be described later, so that one LAN system 100 and one LAN system 200 are illustrated. Only one management server 310 is provided in the information processing system. In the present exemplary embodiment, the management server 310 is provided in the cloud 300, but it is not necessary to limit the installation location to the cloud 300 as long as the installation location can be accessed from the LAN systems 100 and 200.

The shared office LAN system 100 is a LAN system installed in the shared office. In the present exemplary embodiment, the "shared space" is a space in which plural users who do not belong to the same organization coexist. In the present exemplary embodiment, a shared office will be described as an example of a shared space.

Incidentally, "organization" means a group configured to achieve a specific purpose. In a case where users who do not belong to any organization use the shared office, the shared office can be a space shared by multiple users who do not belong to the same organization rather than multiple users who belong to different organizations. In the present exemplary embodiment, for convenience of explanation, it is assumed that the user of the shared office belongs to any organization. In a case where there is a user who does not belong to any of the organizations, it is assumed that there is an organization to which only one individual user belongs. In the present exemplary embodiment, a company will be described as an example of an organization. Therefore, in the following description, "organization" and "company" are used interchangeably. As an organization, there are other educational institutions such as universities.

The company LAN system 200 is a LAN system installed in the company and is constructed outside the shared office. Since the shared office LAN system 100 is used by a user belonging to each of the plurality of companies, the company LAN system 200 is present for each company to which each user belongs and is connected to the network 1.

The image processing apparatus 110 is installed in the shared office and is used only by the users of the shared office. More specifically, the image processing apparatus 110 is available to users belonging to an organization that has a contract with the administrator of the shared office. The image processing apparatus 110 is shared by each user who belongs to each of the plurality of organizations, in other words, plural users who do not belong to the same organization.

The image processing apparatus 110, also called an image forming apparatus, is a multifunction device equipped with various image processing functions such as a printing function, a copying function, and a scanner function, and functions as a first information processing apparatus having a built-in computer. The image processing apparatus 110 includes a CPU as a first processor, a ROM, a RAM, a HDD, a scanner as an image reading device that reads an image on a medium such as paper, a print engine as an image forming device that forms an image on the medium, an operation panel that receives instructions from users and displays information, and a network interface for connecting communication lines such as the network 1 and the LAN 120. Further, the image processing apparatus 110 in the present exemplary embodiment includes a card reader. Further, an external media interface for connecting an external memory device such as a USB memory or a flash memory, and a wireless communication means for performing short-range wireless communication with the user PC 130 may be provided.

The image processing apparatus 110 includes an image processing unit 111, a VPN connection processing unit 112, an authentication processing unit 113, and a management server information storage unit 114. The image processing unit 111 executes image processing in response to a request from the user. The image processing unit 111 provides various image processing functions according to the hardware and software included in the image processing apparatus 110. However, each user who is permitted to use the shared office may not be able to use all the functions provided by the image processing apparatus 110, and may use the functions within the range specified in the contract information regarding the use of the shared office.

The VPN connection processing unit 112 makes a VPN connection with the VPN server 210 of the company LAN system 200 of the company to which the user belongs, in response to a request from the user. In the present exemplary embodiment, the connection between the two parties, that is, the shared office LAN system 100 and the company LAN system 200 so as to be communicable via a VPN is referred to as "VPN connection". Further, the VPN connection processing unit 112 disconnects the connected VPN in response to a release request. The authentication processing unit 113 authenticates whether or not the user of the image processing apparatus 110 is a user belonging to the company to which the VPN connection is made.

Figure 2:
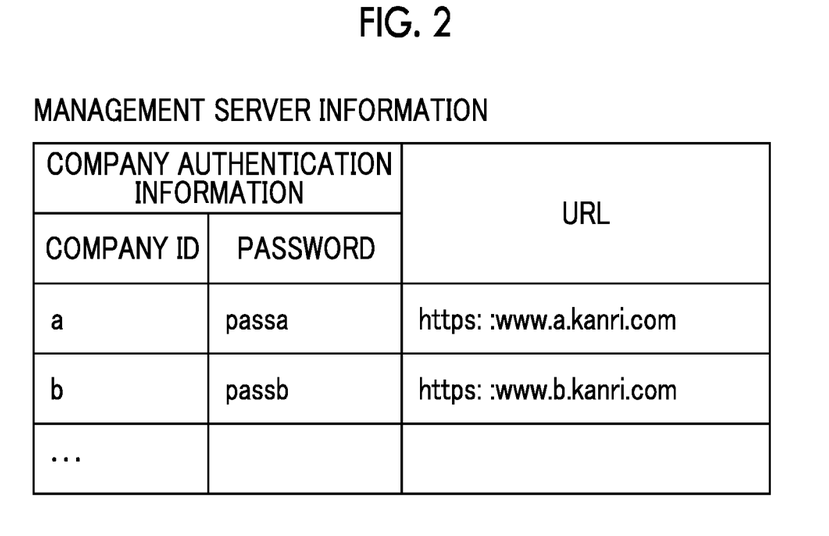
FIG. 2 is a diagram illustrating an example of a data structure of management server information stored in a management server information storage unit according to the present exemplary embodiment.

FIG. 2 is a diagram illustrating an example of a data structure of management server information stored in a management server information storage unit 114 according to the present exemplary embodiment. The management server information is information to be referred to in a case of accessing the management server 310. In the management server information, company authentication information and Uniform Resource Locator (URL) are set as a set for each company to which each user of the shared office belongs. The company authentication information is the authentication information necessary for acquiring the information on the company, and includes the identification information on the company (hereinafter, "company ID") and the password. The URL is storage destination information that specifies a place where information regarding the company is stored. The management server information is set in advance in the management server information storage unit 114 by the administrator of the company or the shared office, etc., in accordance with the contract between the company and the shared office.

Each component 111 to 113 in the image processing apparatus 110 is achieved by a cooperative operation of a computer mounted on the image processing apparatus 110 and a program running on a CPU as a first processor mounted on the computer. Further, the management server information storage unit 114 is achieved by the HDD mounted on the image processing apparatus 110. Alternatively, the RAM or another computer included in the shared office LAN system 100 may be used via the LAN 120.

Further, the user PC 130 is a portable PC brought into the shared office by employees of each company or the like. The user PC 130 has a remote login processing unit 131 achieved by the application. The remote login processing unit 131 provides a function of directly connecting to the company's VPN server 210 via VPN without passing through the image processing apparatus 110, and remotely logging in to a personal computer (hereinafter, "user's desk PC") 230 at the user's own seat in the company. In the present exemplary embodiment, a PC brought into the shared office will be described as an example, but another mobile terminal may be used as long as another mobile terminal has a function of remotely logging in to the user's desk PC 230.

The company LAN system 200 is configured by connecting the VPN server 210, the authentication server 220, and the user's desk PC 230 via a LAN 240.

The VPN server 210 has a function, called a VPN server function or a VPN router function, for making a VPN connection in response to a VPN connection request from an external apparatus, and makes a VPN connection in response to a request from an external network system, in the case of the present exemplary embodiment, the image processing apparatus 110 in the shared office LAN system 100. Then, in a case where the VPN server 210 in the present exemplary embodiment is connected to the image processing apparatus 110 or the user PC 130 in the shared office via a VPN, the VPN server 210 relays the data exchanged with the user's desk PC 230.

Information regarding the image processing apparatus 110 to be connected to the VPN, specifically, identification information on the image processing apparatus 110 and authentication information may be set in advance in the VPN server 210. The image processing apparatus 110 to be set can be specified by contracting with a shared office, and necessary information can be acquired. Instead of the identification information on the image processing apparatus 110, the user ID of the user belonging to the company or the permission information (for example, a certificate or password) issued by the VPN server 210 to the image processing apparatus 110 may be used.

The VPN server 210 is achieved by a cooperative operation of a computer forming the VPN server 210 and a program running on a CPU as the second processor mounted on the computer.

The authentication server 220 performs user authentication of the company's user in the shared office, in response to a request from the image processing apparatus 110. The authentication server 220 is achieved by a cooperative operation of a computer forming the VPN server 210 and a program running on a CPU as the fifth processor mounted on the computer.

A plurality of PCs used by employees and the like are connected to the LAN 240, and the user's desk PC 230 is a PC provided as a second information processing apparatus and used in the company by the employees and the like who use the shared office. The user's desk PC 230 has a remote access control unit 231 and an image process control unit 232. The remote access control unit 231 controls the process after the remote login, in cooperation with the remote login processing unit 131 of the user PC 130. The image process control unit 232 controls the image process executed by the image processing apparatus 110. The remote access control unit 231 and the image process control unit 232 in the user's desk PC 230 are achieved by a cooperative operation of a computer forming the user's desk PC 230 and a program running on a CPU as the fourth processor mounted on the computer.

The VPN server 210, the authentication server 220, and the user's desk PC 230 can all be achieved by existing general-purpose computers, and are equipped with a CPU, a ROM, a RAM, a storage means such as an HDD, a user interface, and a network interface for connecting a communication line such as a network 1 and a LAN 240.

The company LAN system 200 is constructed outside the shared office LAN system 100, and the management server 310 is installed outside the LAN systems 100 and 200. As described above, the management server 310 is installed in the cloud 300 so as to be accessible from the image processing apparatus 110 and the VPN server 210.

The management server 310 has an information management unit 311 and a company information storage unit 312. The information management unit 311 manages company information, and sets and provides company information in response to an external request.

Figure 3:
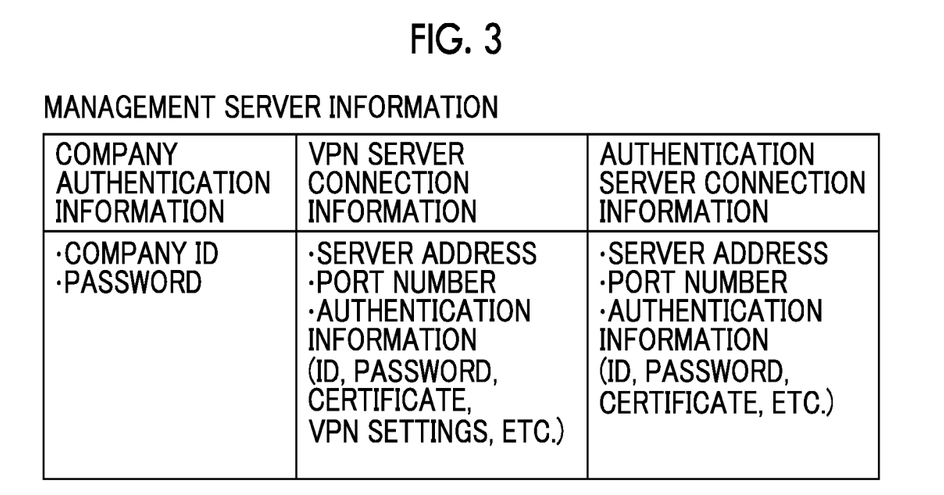
FIG. 3 is a diagram illustrating an example of a data structure of company information stored in a company information storage unit according to the present exemplary embodiment.

FIG. 3 is a diagram illustrating an example of a data structure of company information stored in the company information storage unit 312 according to the present exemplary embodiment. The company information is set in advance for each company to which the user of the shared office belongs. The company information includes information necessary for the image processing apparatus 110 to start accessing the VPN server 210 and the authentication server 220 of each company. The company information includes company authentication information, VPN server connection information, and authentication server connection information. The company authentication information is the authentication information required for accessing the information on the company, and the setting contents are the same as the company authentication information held by the image processing apparatus 110.

The VPN server connection information includes information necessary for the image processing apparatus 110 to make a VPN connection with the VPN server 210 of the company. The VPN server connection information is a server address as address information for specifying the VPN server 210 as an access destination, and is basically an IP address. The port number is a port number for connecting to the VPN server 210. The authentication information is information necessary for the image processing apparatus 110 to be authenticated by the VPN server 210 which is the connection destination, and includes an ID, a password, a certificate issued by the VPN server 210, and VPN settings including setting contents related to communication via the VPN, such as an encryption method and a protocol, for example.

The authentication server connection information includes information necessary for the image processing apparatus 110 to access the authentication server 220 of the company. The authentication server connection information is a server address as address information for specifying the authentication server 220 as an access destination, and is basically an IP address. The port number is a port number for connecting to the authentication server 220, and the authentication information is information necessary for the image processing apparatus 110 to be authenticated by the authentication server 220 which is the connection destination, and includes an ID, a password, a certificate, or the like.

After the company contracts with the shared office, the company information is set by the administrator of the company registering the company information in the company information storage unit 312 of the management server 310 from the VPN server 210 or the administrator's PC (not illustrated).

The information management unit 311 in the management server 310 is achieved by a cooperative operation of a computer forming the management server 310 and a program running on a CPU as a third processor mounted on the computer. Further, the company information storage unit 312 is achieved by the HDD mounted on the management server 310. Alternatively, the storage means of the RAM or another computer present in the cloud 300 may be used.

Further, the program used in the present exemplary embodiment can be provided not only by communication means but also by being stored in a computer-readable recording medium such as a CD-ROM or a USB memory. The programs provided by the communication means and the recording medium are installed in the computer, and various processes are achieved by the CPU of the computer sequentially executing the programs.

Next, the operation in the present exemplary embodiment will be described.

In the present exemplary embodiment, a case where the user brings in the user PC 130 and uses the image processing apparatus 110 will be described. The user can use the printing function, the fax function, and the like mounted on the image processing apparatus 110 within the scope of the contract. In the present exemplary embodiment, a case where the printing function of the image processing apparatus 110 is used will be described as an example.

In a case where the company considers the use of the user PC 130 in the shared office, the user PC 130 may not store the data file to be used by the image processing apparatus 110 for the purpose of preventing information leakage. In this case, the user PC 130 cannot directly send the data to the image processing apparatus 110 to execute printing. Therefore, the user needs to send the data from the user's desk PC 230 or the like in which the data to be actually printed is stored to the image processing apparatus 110 of the shared office to print the data. Then, from the viewpoint of security, the image processing apparatus 110 and the VPN server 210 in the company are connected via a VPN, and then the data to be printed is transmitted.

However, in a case where the shared office LAN system 100 including the image processing apparatus 110 holds and manages the information necessary for the VPN connection, that is, the information unique to the company, information leakage may occur. In this way, holding company-specific information in an apparatus that cannot be managed in the company poses a security compliance problem and needs to be avoided.

Therefore, in the present exemplary embodiment, the management server 310 on the cloud 300 is caused to hold the company-specific information, that is, the company information illustrated in FIG. 3, instead of the image processing apparatus 110, and the image processing apparatus 110 is caused to refer to company information as necessary.

Figure 4:
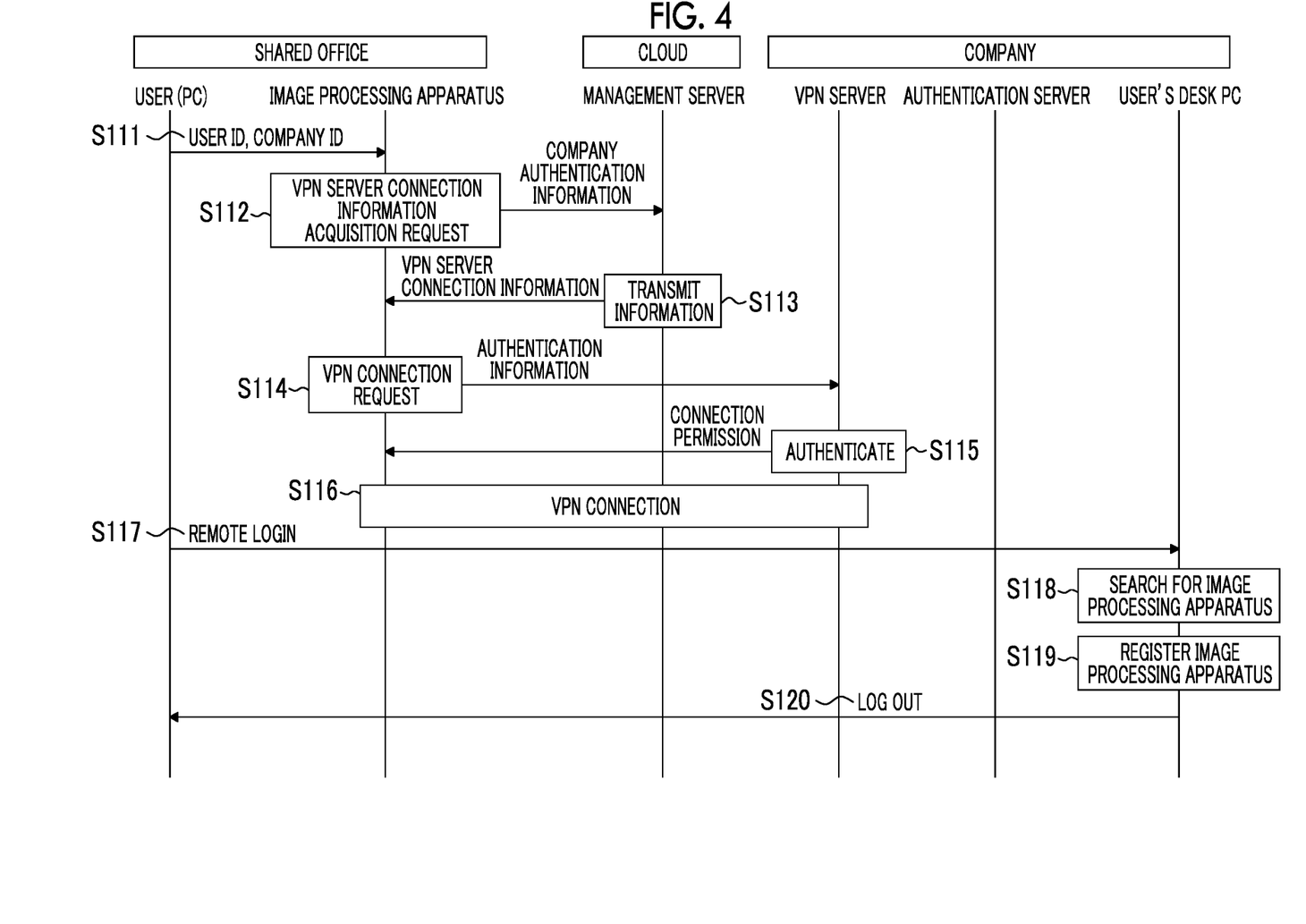
FIG. 4 is a sequence diagram illustrating a process for enabling an image processing apparatus to be used as a printer, in the present exemplary embodiment.

First, a process for enabling the company LAN system 200 to use the image processing apparatus 110 as a printer will be described with reference to the sequence diagram illustrated in FIG. 4. As described above, before performing this process, it is necessary to set in advance various types of information illustrated in FIGS. 2 and 3 and information on the image processing apparatus 110 in the VPN server 210, based on the contract between the company and the shared office.

A user in a shared office holds an IC card, the user is carrying, over a card reader (not illustrated) of the image processing apparatus 110. The IC card is provided by the shared office or the company, and the identification information (hereinafter, "user ID") of the user who carries the IC card and the company ID are recorded. In a case where the image processing apparatus 110 acquires the user ID and the company ID from the IC card (step S111), the image processing apparatus 110 acquires the management server information corresponding to the company by searching for the management server information, based on the acquired company ID. Then, the image processing apparatus 110 designates the URL included in the acquired management server information, and transmits the acquisition request of the VPN server connection information including the company authentication information to the management server 310 (step S112).

In a case where the information management unit 311 in the management server 310 receives the request from the image processing apparatus 110, the information management unit 311 authenticates the company, based on the company authentication information included in the request, and then returns the VPN server connection information on the company (step S113).

In a case where the VPN server connection information is acquired from the management server 310, the VPN connection processing unit 112 in the image processing apparatus 110 transmits a VPN connection request including authentication information to the server address and port number included in the VPN server connection information (step S114).

In a case of receiving the VPN connection request from the image processing apparatus 110, the VPN server 210 authenticates the image processing apparatus 110 based on the authentication information included in the request, and then returns the connection permission (step S115).

As described above, the image processing apparatus 110 makes a VPN connection with the VPN server 210 owned by the company to which the user holding the IC card belongs (step S116).

In a case where the user checks that the VPN connection has been established, for example, by seeing the display on the operation panel of the image processing apparatus 110, the user performs a predetermined operation on the user PC 130. In response to this user operation, the remote login processing unit 131 connects to the LAN 240, by connecting the user PC 130 to the VPN server 210 via the VPN, separately from the image processing apparatus 110. Then, the user remotely logs in to the user's desk PC 230 (step S117).

Since the image processing apparatus 110 is virtually connected to the LAN 240 via the VPN, the image processing apparatus 110 is recognized as a printer that can be used in the company LAN system 200. Thus, the user who has remotely logged in to the user's desk PC 230 can search for the image processing apparatus 110 in the list of available printers (step S118), so that the user performs a predetermined operation to register the image processing apparatus 110 as a printer capable of transmitting a print job (step S119).

In a case of checking that the image processing apparatus 110 is registered in the user's desk PC 230 as an available printer as described above, the user then logs out from the user's desk PC 230 (step S120). In this case, the user logs out, but the user may or may not log out.

Figure 5:
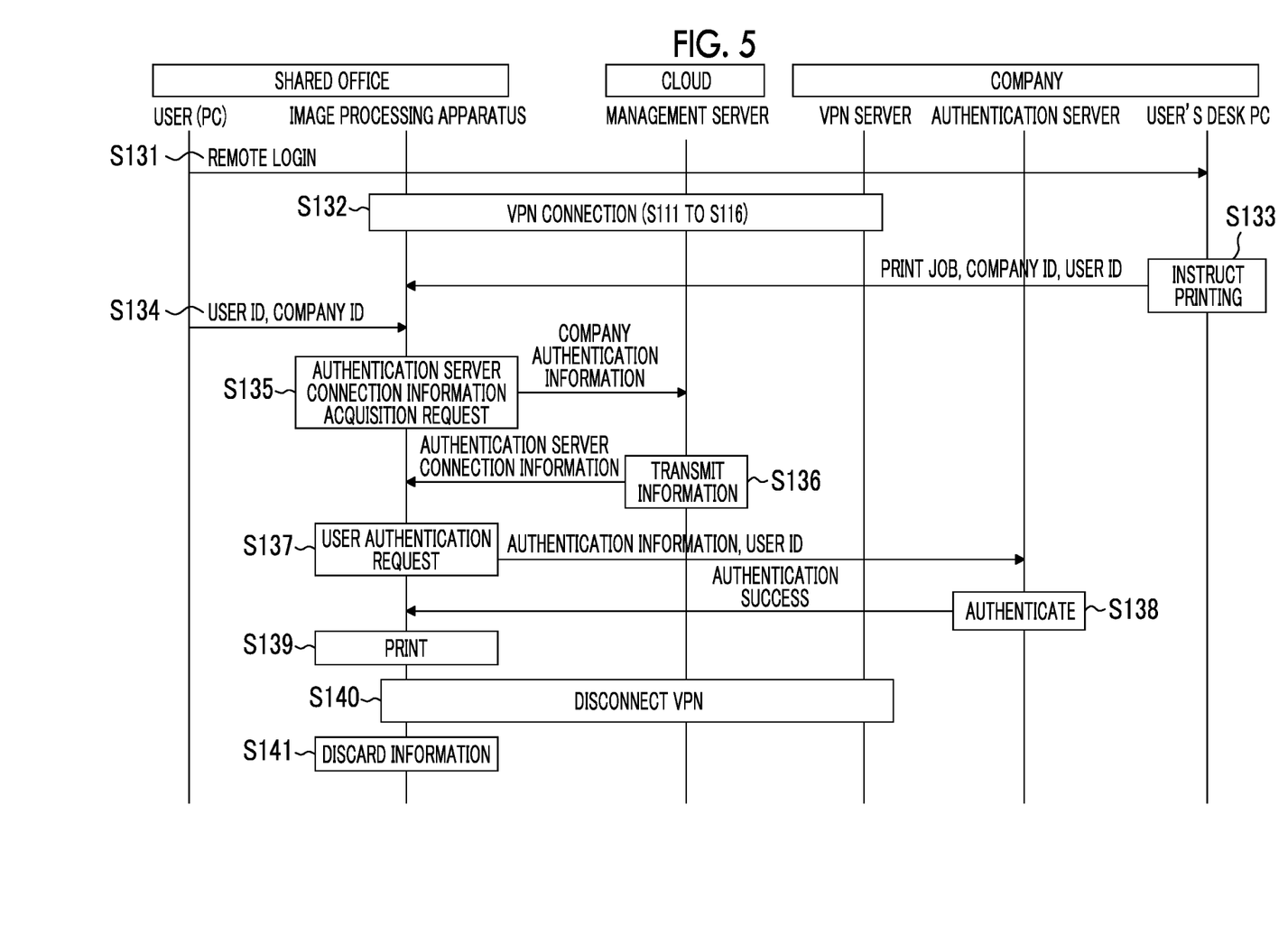
FIG. 5 is a sequence diagram illustrating a process of causing the image processing apparatus to execute printing, in the present exemplary embodiment.

After registering the image processing apparatus 110 as a printer that can be used by the user's desk PC 230 as described above, the process of causing the image processing apparatus 110 to perform printing will be described with reference to the sequence diagram illustrated in FIG. 5.

First, the user performs a predetermined operation on the user PC 130 to connect the user PC 130 to the VPN server 210 via VPN separately from the image processing apparatus 110, and then remotely logs in to the user's desk PC 230 (step S131). In a case where the user has not logged out in step S120, the user does not need to remotely log in again here. In a case where the VPN is disconnected, the user holds the IC card over the card reader and causes the image processing apparatus 110 to perform the above-described processes (steps 111 to 116) to connect to the VPN (step S132). Thus, the image processing apparatus 110 is registered as a printer that can be used by the user's desk PC 230.

In a case where the user remotely logs in to the user's desk PC 230 and performs a predetermined operation, the image process control unit 232 instructs the image processing apparatus 110 to print (step S133). According to this print instruction, the print job to be printed is transmitted to the image processing apparatus 110. The job information on the print job includes a user ID and a company ID as information for specifying the print instruction source. In this way, the print job is accumulated in the image processing apparatus 110. The user may or may not log out from the user's desk PC 230.

After that, the user holds the IC card, the user is carrying, over the card reader of the image processing apparatus 110 to output a print instruction to the image processing apparatus 110. In a case where the image processing apparatus 110 acquires the user ID and the company ID from the IC card (step S134), the image processing apparatus 110 acquires the management server information corresponding to the company by searching for the management server information, based on the acquired company ID. Then, the image processing apparatus 110 designates the URL included in the acquired management server information, and transmits the acquisition request of the authentication server connection information including the company authentication information to the management server 310 (step S135).

In a case where the information management unit 311 in the management server 310 receives the request from the image processing apparatus 110, the information management unit 311 authenticates the company, based on the company authentication information included in the request, and then returns the authentication server connection information on the company (step S136).

In a case where the authentication server connection information is acquired from the management server 310, the authentication processing unit 113 in the image processing apparatus 110 requests user authentication, by transmitting a user authentication request including the authentication information and the user ID acquired from the IC card, to the server address and port number included in the authentication server connection information, via the VPN (step S137).

In a case where the authentication server 220 receives the user authentication request from the image processing apparatus 110, the authentication server 220 authenticates the image processing apparatus 110 based on the authentication information included in the request, and then performs user authentication, based on the user ID included in the user authentication request (step S138). Here, the description will be continued assuming that the user authentication is successful.

In a case where the authentication processing unit 113 checks that the user of the image processing apparatus 110 is a user belonging to the company to which the VPN connection is made, the authentication processing unit 113 takes out the print job registered in advance by the user in the image processing apparatus 110 and executes printing (step S139). That is, the image processing apparatus 110 executes the printing process based on the print job received via the VPN in response to the instruction from the user PC 130 used by the user holding the IC card.

The image processing apparatus 110 may disconnect the VPN, in a case where printing is completed (step S140). In a case where the VPN is disconnected, and the image processing apparatus 110 holds internally the information acquired from the user or the management server 310, the information is discarded by deleting the information from the image processing apparatus 110 (step S141). By discarding the information, the user belonging to another company is not given the opportunity to acquire information from the image processing apparatus 110. That is, it is possible to prevent information leakage.

As described above, according to the present exemplary embodiment, the image processing apparatus 110 can be connected to the VPN server 210 via a VPN, without having the shared office side hold and manage the information regarding the company. Then, the image processing apparatus 110 performs printing by executing the print job received via the VPN. In other words, it is determined that the print job not received via the VPN does not pass through the regular route, and the image processing apparatus 110 does not execute the print job received without passing through the VPN.

By the way, in the above description, the process of enabling the image processing apparatus 110 to be used in the user's desk PC, that is, the process of registering the image processing apparatus 110 in the user's desk PC, and the process of actually using the image processing apparatus 110, that is, the process of causing the image processing apparatus 110 to perform printing have been described separately. However, the registration and printing of the image processing apparatus 110 may be continuously performed in combination with the above-described processing.

For example, the user holds the IC card over after remotely logging in to user's desk PC 230. The image processing apparatus 110 transmits a request for acquiring VPN server connection information and authentication server connection information to the management server 310 in response to this operation. Thus, the image processing apparatus 110 acquires both the VPN server connection information and the authentication server connection information. Then, the image processing apparatus 110 is registered as a printer that can be used by the user's desk PC 230, by being connected to the VPN server 210 via a VPN by using the VPN server connection information.

Subsequently, the user gives a print instruction from the user's desk PC 230. In response to this print instruction, the image processing apparatus 110 performs user authentication by using the authentication server connection information acquired from the management server 310 and the user ID read from the IC card. In a case where the authentication is successful, the image processing apparatus 110 executes the print job received when the print instruction is given.

Incidentally, in the present exemplary embodiment, the user PC 130 and the user's desk PC 230 brought into the shared office have been described as different PCs. However, it is also conceivable to take out the user's desk PC 230 used in the company and use the user's desk PC 230 as the user PC 130 in the shared office. In this case, the user PC 130 does not log in to the user's desk PC 230 remotely, but simply connects to the LAN 240 via the VPN server 210. Thus, the VPN-connected image processing apparatus 110 can be registered in the user PC 130 as a available printer. In a case where the print job is stored inside the company LAN system 200, the user designates the print job from the user PC 130 and gives a print instruction, but the print instruction including the print job is sent to the image processing apparatus 110 via the VPN between the VPN server 210 and the image processing apparatus 110.

Further, in a case where the print job is stored in the user PC 130, the user designates the print job from the user PC 130 and gives a print instruction, but the print instruction including the print job is not directly sent to the image processing apparatus 110 but is sent to the image processing apparatus 110 via the VPN server 210 for security reasons. In this way, the image processing apparatus 110 executes printing in response to an instruction from the user.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a first processor mounted on a first information processing apparatus installed in a shared space and shared by a plurality of users who do not belong to the same organization;
a second processor mounted on a connection server installed outside the shared space and connected to a local area network of an organization to which each of the plurality of users belong, the connection server having a virtual private line connection function; and
a third processor mounted on a management server which is installed outside the shared space and the local area network of each organization, and manages connection server connection information necessary for establishing a virtual private line with the connection server of each organization,
wherein the third processor is configured to:
in response to a connection information acquisition request in which identification information on an organization transmitted from the first information processing apparatus is designated, return the connection server connection information corresponding to the organization designated in the connection information acquisition request, and
the first processor is configured to:
connect a virtual private line with the connection server of the organization, by using the connection server connection information corresponding to the organization acquired by transmitting, to the management server, the connection information acquisition request including the identification information on the organization designated from a user of the first information processing apparatus.

2. The information processing system according to claim 1, wherein the first information processing apparatus is an image processing apparatus.

3. The information processing system according to claim 2, further comprising:
a fourth processor mounted on a second information processing apparatus used by a user who uses the shared space, wherein the fourth processor is configured to:
connect to a local area network of an organization to which the user belongs, and
register the image processing apparatus connected to a connection server of the organization via the virtual private line, in the second information processing apparatus, as an apparatus for executing information processing.

4. The information processing system according to claim 3, wherein the first processor is configured to:
execute a print job received via the virtual private line in response to an instruction from the second information processing apparatus.

5. The information processing system according to claim 3, wherein the first processor is configured to:
not to execute a print job instructed by a user belonging to the organization, in a case where the print job is received without passing through the virtual private line.

6. The information processing system according to claim 3, wherein the fourth processor is configured to:
delete registration of the image processing apparatus from the second information processing apparatus, in a case where disconnection of the virtual private line is detected.

7. The information processing system according to claim 1, further comprising:
a fifth processor mounted on an authentication server that is connected to the local area network of each organization and authenticates users belonging to the organization,
wherein the third processor is configured to:
in response to an access information acquisition request in which organization identification information transmitted from the first information processing apparatus is designated, return authentication server access information which is held in the management server, is required for access to the authentication server, and corresponds to the organization designated in the access information acquisition request, and
the first processor is configured to:
acquire the identification information on the user designated by the user of the first information processing apparatus;
transmit an access information acquisition request including the identification information on the organization designated by the user of the first information processing apparatus to the management server to acquire authentication server access information corresponding to the organization; and request the authentication server to authenticate the user via the virtual private line, by using the acquired authentication server access information and user identification information.

8. The information processing system according to claim 7, further comprising:

a fourth processor mounted on a second information processing apparatus used by a user who uses the shared space, wherein the first processor is configured to:

execute information processing, based on data received via the virtual private line, in response to an instruction from the second information processing apparatus used by a user who has succeeded in authentication.

9. An image forming apparatus comprising a processor, installed in a shared space, and shared by a plurality of users who do not belong to the same organization, in an information processing system including the image forming apparatus, a connection server installed outside the shared space and connected to a local area network of an organization to which each of the plurality of users belong, the connection server having a virtual private line connection function, and a management server which is installed outside the shared space and the local area network of each organization, and manages connection server connection information necessary for establishing a virtual private line with the connection server of each organization, wherein the processor is configured to:

connect a virtual private line with the connection server of the organization, by using the connection server connection information corresponding to the organization acquired by transmitting, to the management server, the connection information acquisition request including the identification information on the organization designated from a user of the image forming apparatus.

10. A non-transitory computer readable medium storing a program causing: in an information processing system including an information processing apparatus installed in a shared space and shared by a plurality of users who do not belong to the same organization, a connection server installed outside the shared space and connected to a local area network of an organization to which each of the plurality of users belong, the connection server having a virtual private line connection function, and a management server which is installed outside the shared space and the local area network of each organization, and manages connection server connection information necessary for establishing a virtual private line with the connection server of each organization, a computer configuring the management server to execute a function of, in response to a connection information acquisition request in which identification information on an organization transmitted from the information processing apparatus is designated, returning the connection server connection information corresponding to the organization designated in the connection information acquisition request; and a computer configuring the information processing apparatus to execute a function of connecting a virtual private line with the connection server of the organization, by using the connection server connection information corresponding to the organization acquired by transmitting, to the management server, the connection information acquisition request including the identification information on the organization designated from a user of the information processing apparatus.

* * * * *